United States Patent [19]

Cullimore

[11] Patent Number: 5,214,422

[45] Date of Patent: May 25, 1993

[54] REMOTE CONTROL AND SIGNALING SYSTEM

[75] Inventor: Jay N. Cullimore, Oakland, Mich.

[73] Assignee: Vidtronics, Inc., Oakland, Mich.

[21] Appl. No.: 839,464

[22] Filed: Feb. 20, 1992

[51] Int. Cl.$^5$ .......................................... H04B 10/00
[52] U.S. Cl. ................. 340/825.72; 359/146; 211/13; 248/172; 248/676
[58] Field of Search ............ 340/825.69, 825.72; 359/145, 142, 146; 455/90, 151.2, 151.4, 347, 352; 358/194.1; 206/328, 557; 248/146, 172; 211/13

[56] References Cited

U.S. PATENT DOCUMENTS

| | | | |
|---|---|---|---|
| 3,928,760 | 12/1975 | Isoda | 250/199 |
| 4,709,412 | 11/1987 | Seymour et al. | 359/145 |
| 4,809,359 | 2/1989 | Dockery | 359/145 |
| 4,848,609 | 7/1989 | Meghnot | 211/13 |
| 4,864,647 | 9/1989 | Harrington | 359/145 |
| 4,893,222 | 1/1990 | Mintzer | 248/172 |
| 4,897,883 | 1/1990 | Harrington | 359/145 |
| 4,911,389 | 3/1990 | Self | 248/172 |
| 4,991,817 | 2/1991 | Von Kleist et al. | 248/676 |
| 5,042,670 | 8/1991 | Timberlake | 248/676 |
| 5,073,979 | 12/1991 | Webb | 359/142 |
| 5,092,459 | 3/1992 | Uljanic et al. | 206/328 |
| 5,127,615 | 7/1992 | Jones | 211/13 |

FOREIGN PATENT DOCUMENTS

2744057A1 4/1979 Fed. Rep. of Germany .
0162846 6/1990 Japan .................... 359/145

OTHER PUBLICATIONS

"What's New In Electronics", Popular Science, Feb. 1988.
Intronics Corporation, "Stop The Music!", 1991.
Recoton, "Wireless IR Remote Control Extender", (undated).

Primary Examiner—Donald J. Yusko
Assistant Examiner—Dervis Magistre
Attorney, Agent, or Firm—Dykema Gossett

[57] ABSTRACT

Several remote control and signaling systems 10, 80 allow for the remote operational control of an apparatus 20, by a transmitter 14. These systems 10, 80 obviate the need for a line of sight relationship between transmitter 14 and control apparatus 20 and are further adapted to receive original control signal 15 and to thereafter generate a relatively high frequency signal 22, to facilitate this desired control. Moreover, a transmitter mounting assembly 90 is adapted to removably mount several dissimilar transmitters 98, 100, 102 and which allows for the remote control of a plurality of apparatuses 20 in an efficient manner.

1 Claim, 3 Drawing Sheets

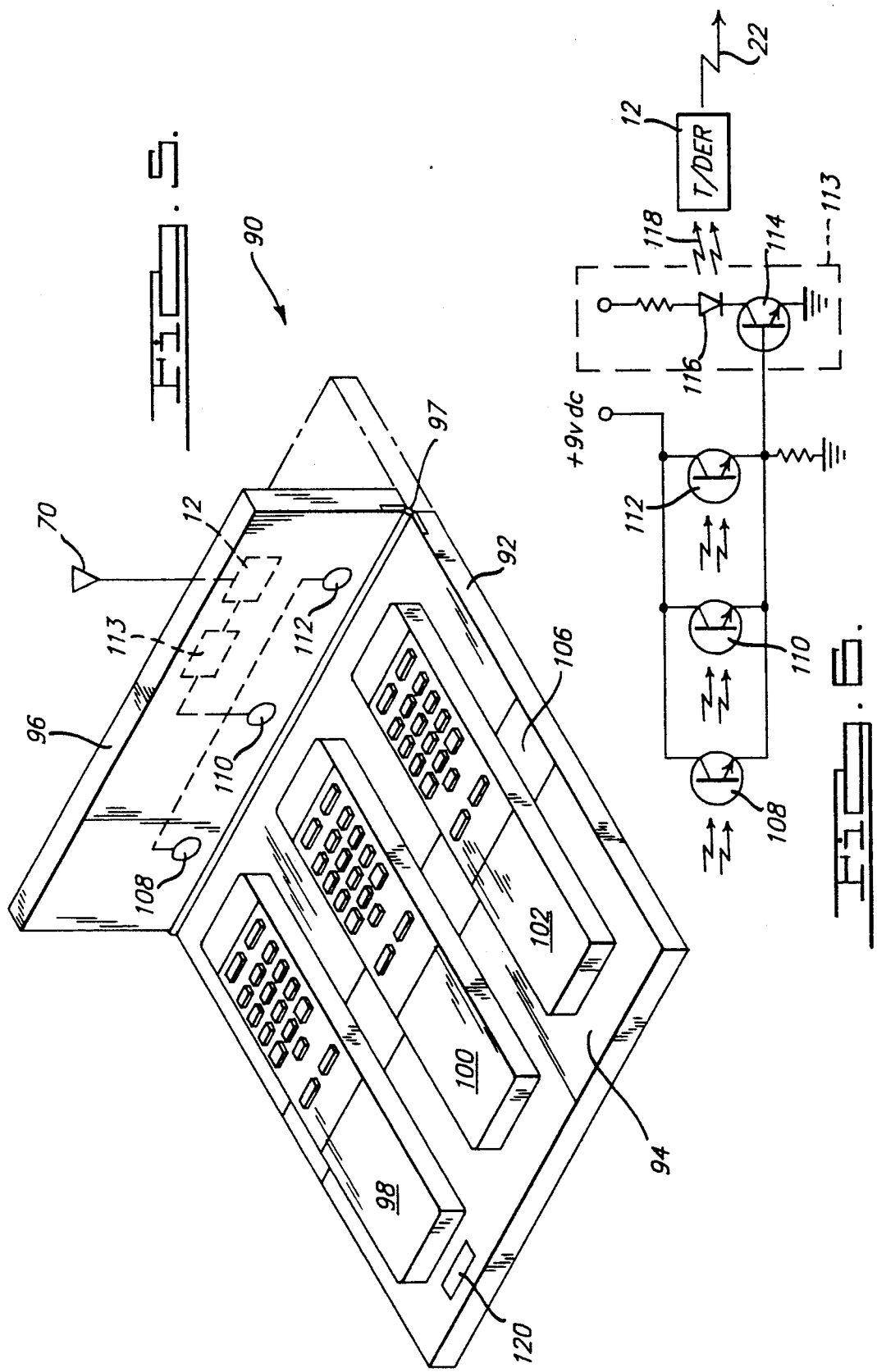

REMOTE CONTROL AND SIGNALING SYSTEM

BACKGROUND OF THE INVENTION

1. Field of the Invention

This invention relates to a remote control and signaling system, and more particularly to a system adapted to allow an apparatus to be operationally controlled by use of a remote signal transmitter.

2. Discussion

Remote control and signaling systems are used in a wide variety of applications requiring the remote operational control of an apparatus, such as a television or a video cassette recorder. Normally these systems employ a transmitter, remotely positioned from the apparatus, and adapted to selectively transmit one or more first control signals. These prior systems further employ a receiver, physically coupled to the apparatus and adapted to receive the transmitted control signals. In response to the received control signals, the receiver is adapted to generate and transmit one or more second control signals to the controlled apparatus. These second control signals are effective to operationally control the apparatus, in accordance with the specifications included within the first control signals. Examples of these operational controls may include activation, deactivation, channel selection, volume adjustment, or operating mode (i.e., record/play).

While these prior systems have adequately allowed for the operational control of a wide variety of apparatus, the transmitters have normally been adapted to generate relatively low power and low frequency first control signals, requiring the transmitter to be in a "line of sight" relationship with the receiver. Absent this line of sight relationship, the first control signals are absorbed or reflected by objects positioned between the transmitter and the receiver, and are thereby prevented from being properly received by the receiver. This has required a user to physically move in very close proximity to the apparatus, in order to allow this operational control to be achieved. This is very inconvenient, especially when the user is lying or resting on a coach or is in a separate room from the receiver or apparatus.

Moreover, even if a line of sight relationship exists between the transmitter and receiver, the transmitted first control signals could fail to reach the receiver if the distance between the transmitter and receiver is too great, thus further annoying the user and adding to the effort required to control the apparatus. Additionally, there has been a great proliferation in the number and types of different remote signaling and control systems which are in use. This proliferation has resulted in the need for a user to employ a great number of different transmitters in order to control the variety of apparatus found in a normal home. This requires a user to store a great number of transmitters and to remember which of the individual transmitters correlates to or is associated with an individual apparatus that is presently desired to be controlled. This proliferation has been found to be very inefficient, cumbersome, and undesirable due to the likelihood of transmitter misplacement as well as to the unsightliness of a multitude of transmitters placed at various locations within a room. Moreover, should a user forget which of the transmitters corresponds to a given apparatus to be controlled, each of the multitude of transmitters must be separately tested to determine the identity of the desired transmitter.

SUMMARY OF THE INVENTION

It is therefore, a primary object of this invention to provide a remote control and signaling system which allows for the selective operational control of an apparatus.

It is another object of this invention to provide a remote control and signaling system, which allows a transmitter to control an apparatus from a remote and a non-"line of sight" location.

It is yet another object of this invention to provide a remote control and signaling system which is adapted to cooperate with an existing remote transmitter and receiver assembly and which increases the communicative distance between transmitter and receiver.

It is yet a further object of this invention to provide for a remote control and signaling system which allows for the efficient use of a plurality of dissimilar transmitter units.

According to one aspect of the present invention, a remote control and signaling system is provided for use with a remote transmitter, adapted to transmit at least one infrared signal, and a receiver controller adapted to receive the at least one infrared signal and to thereafter generate a signal, effective to operationally control an apparatus. The system comprises transducer means, adapted to be attached to the transmitter, for receiving the at least one infrared signal and thereafter for transmitting a third signal, in response to the received at least one infrared signal; and receiver means, adapted to be attached to the controller, for receiving the transmitted third signal and thereafter for transmitting a fourth signal to the controller, said fourth signal being substantially identical to the at least one infrared signal.

According to a second aspect of the present invention, a transmitter controller assembly is provided, for use in combination with a first and a second transmitter, each of the transmitters being adapted to generate and transmit respective first and second control signals for receipt by respective first and second receivers, each of the receivers being adapted to control an apparatus. The assembly comprises a horizontal planar base member adapted to removably support the first and second transmitters; and a second hollow member, vertically attached to the horizontal planar base member and adapted to receive the receivers effective to allow the first and second receivers to respectively receive the first and second control signals.

Further objects, features and advantages of the invention will become apparent from a consideration of the following description and claims, when taken in conjunction with the accompanying drawings.

BRIEF DESCRIPTION OF THE DRAWINGS

Various advantages of the present invention will become apparent to those skilled in the art by reading the following specification and by reference to the following drawings in which:

FIG. 5 is a perspective view of a transmitter control assembly made in accordance with the teachings of the a third embodiment of this invention;

FIG. 6 is a block diagram of a portion of the transmitter control assembly, shown in FIG. 5 and contained within the hollow vertical member;

DETAILED DESCRIPTION OF THE INVENTION

Figure 1:
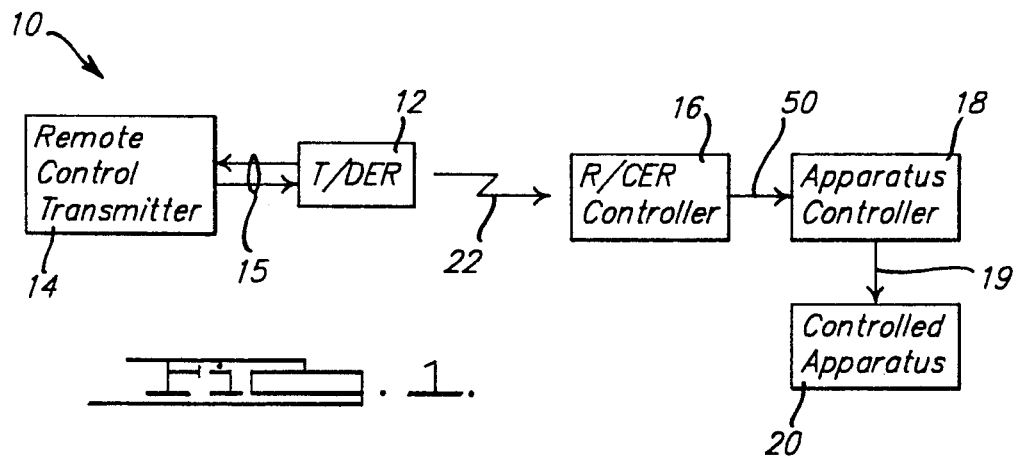
FIG. 1 is a block diagram of a remote control and signaling system made in accordance with the teachings of a first embodiment of the present invention.

Referring now to FIG. 1, there is shown a remote control and signaling system 10, made in accordance with the teaching of a first embodiment of this invention. As shown, system 10 includes a transducer or transmitter controller 12 adapted to have an input coupled to the signal output of a typical remote control transmitter 14. Moreover, system 10 further includes a receiver controller 16 in communication with transducer 12 and having a signal output coupled to the input of a typical apparatus controller 18. As further shown, apparatus controller 18 has a signal output typically coupled to a controlled apparatus 20, such as a television or video cassette recorder, which is adapted to operationally control apparatus 20.

In operation, transducer 12 receives the typically generated infrared control signals 15 from remote control transmitter 14 and, in response to the received control signals, generates an invisible and high frequency signal 22 to receiver controller 16. The use of such a high frequency signal 22 allows the transmitter 14 and transducer 12 to be remotely placed from receiver 16, controller 18, and apparatus 20. Moreover, the use of such a high frequency signal 22 obviates the need for transmitter 14 to be placed in a "line of sight relationship" with controller 18 thereby allowing a system user much versatility in controlling apparatus 20.

Upon receipt of the relatively high frequency signal 22, receiver 16 generates an infrared signal to controller 18, which, in one embodiment is substantially identical to the infrared signal transmitted to transmitter 14. Controller 18, upon receipt of the infrared signal generated by receiver 16, generates a control signal to apparatus 20, effective to operationally control the apparatus in the manner known to have been specified by the original infrared signal 15.

Figure 2:
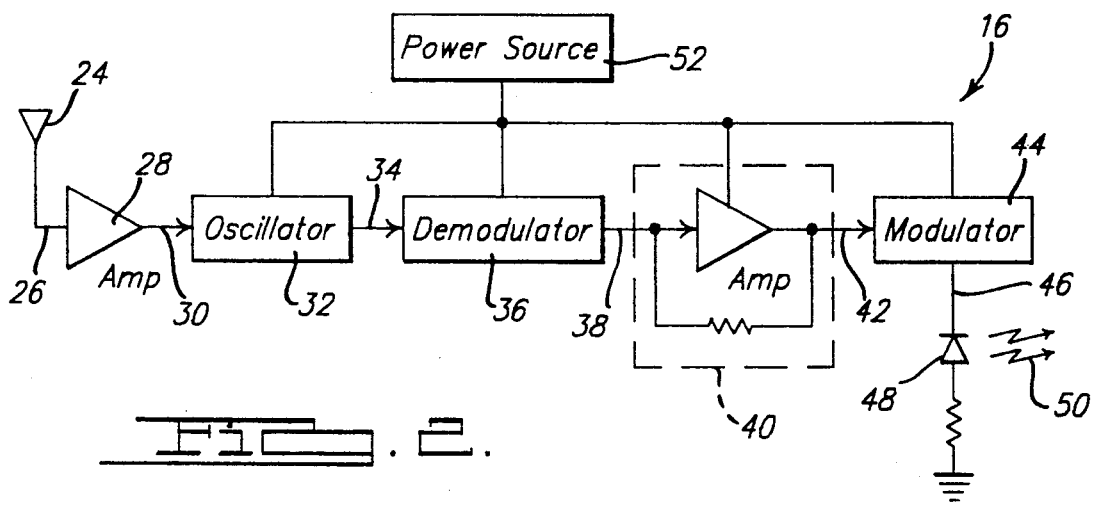
FIG. 2 is a block diagram of the receiver controller shown in FIG. 1.

Turning now to FIG. 2, there is shown a block diagram of receiver 16. As shown, receiver 16 includes an antenna 24, adapted and tuned to receive the signal 22 and to produce an electrical signal output onto bus 26. In the preferred embodiment of this invention, antenna 24 comprises an approximate nine inch copper dipole antenna, although other types and variations of antennas are contemplated for use by this invention.

The signal on bus 26 is then input into an amplifier 28 where it is amplified and isolated from antenna 24. In the preferred embodiment of this invention, amplifier 28 comprises a Motarola Model MPSH10 having a beta value of approximately 500. The amplified signal is then output onto bus 30, and input to quench oscillator 32, adapted to "down convert" the carrier frequency to a much lower frequency. That is, in the preferred embodiment of this invention (and as will be explained), signal 22 is modulated with a carrier frequency of approximately 315 Mhz. This relatively high frequency carrier signal is then down converted to approximately 480 Khz, by oscillator 32. The down converted signal is then output onto bus 34 and input to demodulator 36.

Demodulator 36, in the preferred embodiment of this invention, is adapted to remove the carrier signal (comprising a frequency of approximately 480 Khz) and to output, onto bus 38 a demodulated signal. This demodualted signal is then input to a schmidt trigger and audio comparator assembly 40, having an amplification factor, in the preferred embodiment of this invention of approximately 1,000 and further adapted to produce a substantially square wave signal output onto bus 42. This output signal is then modulated by use of a carrier signal having a frequency of approximately 40 Khz, by modulator 44. In the preferred embodiment of this invention, modulator 44 comprises a known "555" timer apparatus.

The modulated signal is then output onto bus 46 to a typical infrared emitter assembly 48. In the preferred embodiment of this invention, infrared emitter assembly 48 comprises a Sharp Model GL528. Assembly 48 is adapted to emit an infrared signal 50 which is adapted, in one embodiment of this invention, to be substantially identical to the originally produced infrared signal 150. Moreover, infrared signal 50 is optically coupled to apparatus controller 18 and is effective, when received by controller 18, to cause controller 18 to generate a typical operational control signal 19 to controlled apparatus 20. Moreover, receiver 16 further includes a power source 52 coupled to amplifier 28, oscillator 32, demodulator 36, Schmidt Trigger and Audio Comparator assembly 40, and modulator 44 and, in the preferred embodiment of this invention, is adapted to provide a direct current voltage of approximately 6 volts and a current of approximately 200 milli-amps.

Figure 3:
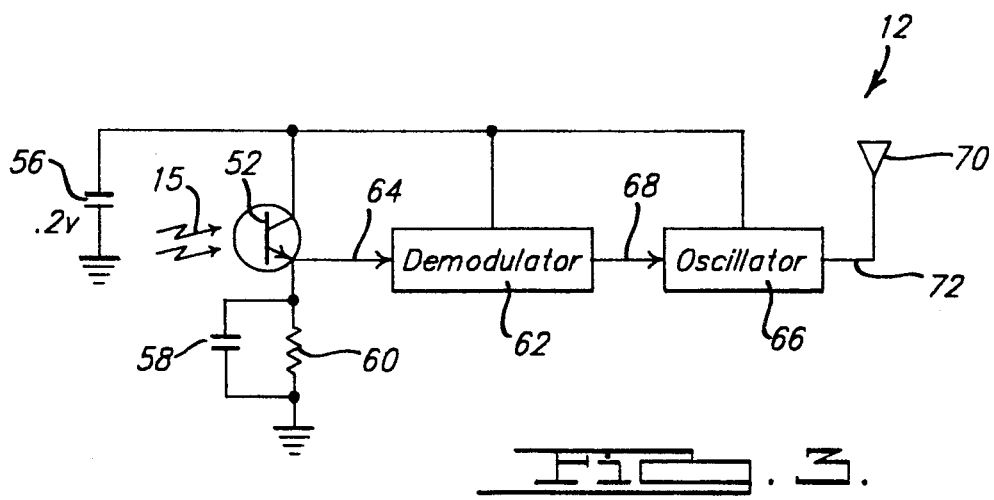
FIG. 3 is a block diagram of the transducer shown in FIG. 1.

Turning now to FIG. 3, there is shown a block diagram of transducer or transmitter controller 12. As shown, transducer 12 includes a transistor 52 having a base portion optically coupled to the infrared signals 15, typically transmitted by transmitter 14. Moreover the collector of transistor 52 is coupled to a voltage source 56 of approximately 12 volts, while the emitter portion of transistor 52 is coupled to a parallel arrangement of capacitor 58 and resistor 60, for biasing purposes. In the preferred embodiment of this invention, resistor 60 comprises a value of approximately 10kΩ while capacitor 58 comprises a value of approximately 0.01 nanofareds.

The infrared signal 15 impressed upon the base of transistor 52 is effective, as will be known to those skilled in the art, to cause the emitter output of substantially square-shaped pulses having an amplitude of approximately 12 volts. These pulses are coupled to demodulator 62 by means of bus 64.

Demodulator 62 is adapted to remove the carrier frequency associated with the infrared signal 52. In the preferred embodiment of this invention the carrier frequency is approximately 40 Khz, but could vary with the type of transmitter 14 in use. The demodulated signal is then input to an oscillator 66 by means of bus 68. Oscillator 66, in the preferred embodiment of this invention comprises a Colpitts oscillator which is "saw stabilized". Oscillator 66 is adapted to modulate the signal appearing on bus 68, by use of a carrier signal having a preferred frequency of approximately 315

Mhz. This modulated signal is then input to antenna 70 by means of bus 72. Antenna 70, in the preferred embodiment of this invention, comprises a strip loop antenna which is adapted to receive the modulated signal appearing on bus 72, and to radiate the signal to the surrounding area. This radiated signal 22 is then communicated to receiver 16, in the previously described manner. Lastly, in the preferred embodiment of this invention, power source 56 is further coupled to demodulator 62 and oscillator 66.

In the previously described manner, it will be apparent to one of ordinary skill in the art that the remote control and signaling system 10 is adapted to receive the originally transmitted infrared signals 15, emanating from transmitter 14, and to generate a second relatively high frequency signal 22. Signal 22 is adapted to be received by receiver 16 and is effective to cause receiver 16 to generate a third infrared signal 50. In one embodiment of this invention, signal 50 is substantially identical to the originally generated infrared signal 15 and is transmitted to controller 18. The transmitted third signal is then effective to cause controller 18 to generate a fourth control signal, to apparatus 20, effective to operationally control the apparatus in the manner known to be specified by signal 15.

Figure 7:
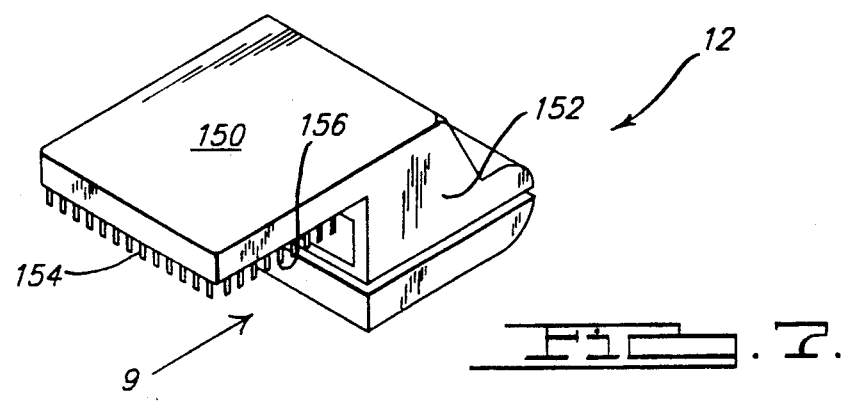
FIG. 7 is a partial perspective view of the transducer shown in FIG. 2.

In order to allow system 10 to be readily used by existing remote control transmitters 15 and controllers 18, without requiring great effort, it was highly desirable to minimize or obviate the need for any electrical modifications to be made to either transmitter 15 or controller 18, while concomitantly allowing for easy system installation. This was achieved by use of the physical configuration shown in FIGS. 7 and 8.

As shown, transmitter controller 12 is manufactured into a substantially "L" shape configuration, including a top planar horizontal member 150 and a substantially vertical member 152. As is further shown, controller 12 is adapted to have to receive an adhesive bonding strip 154, such as Velcro material, on the under surface 156 of member 150. Moreover, transmitter 52 is located behind screen 158 and housed within member 152 while demodulator 62 and oscillator 66 are housed in the outwardly protruding portion of member 152.

Figure 8:
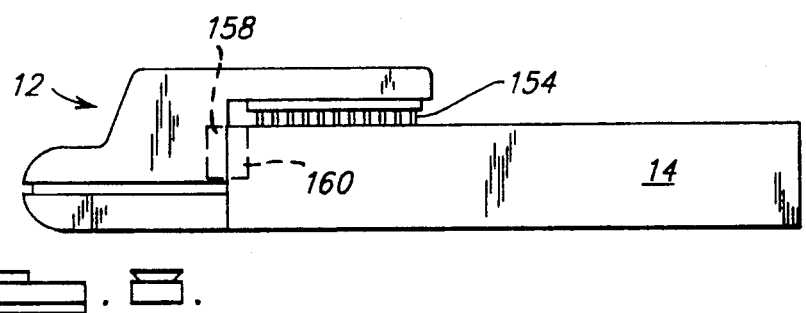
FIG. 8 is an end view of the transducer of FIG. 7, shown in assembled relationship with a typical remote control transmitter.
Figure 9:
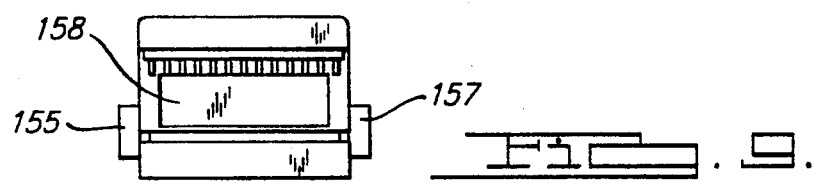
FIG. 9 is a view of an alternative embodiment of the transducer shown in FIG. 7, taken in the direction of arrow 9.

As shown best in FIG. 8, transmitter controller 12 is adapted to movably receive transmitter 14 in the substantially "C" shaped area cooperatively formed by members 150 and 152, such that strip 154 overlays and movably bonds to the top surface of the transmitter 14. In this arrangement, the typical transmitter signal producing portion 160 is adapted to be placed in confrontational and abutting relation with screen 158. In this manner, signals 15 are efficiently communicated to transistor 52. Moreover, as will be appreciated by one of ordinary skill in the art, transmitter controller 12 may be easily and movably attached to transmitter 14 without requiring extensive electrical or physical modification of the transmitter. Moreover, controller 16 may similarly be so configured so as to similarly attach to controller 18. Therefore, it should be appreciated by one of ordinary skill in the art that system 10 may easily be added to an existing transmitter 14/controller 18 arrangement and that antennas 24, 70 may be easily attached, if desired, to member 152. Alternatively, in another embodiment if transmitter controller 12 or controller 18 (as shown in FIG. 9), outwardly projecting wing portions 155, 157 may be molded or removably attached to the edges of member 152 in a manner which will cause them to be substantially coplanar with screen 158. Moreover, portions 155, 157 are adapted to include adhesive strips (such as double sided tape) on the surface projecting or closest to the transmitter 14. In this manner, wing portions 155, 157 cooperate to allow controller 12 to be removably attached to transmitter 14 and may obviate the need for strip 154 or even member 150.

Figure 4:
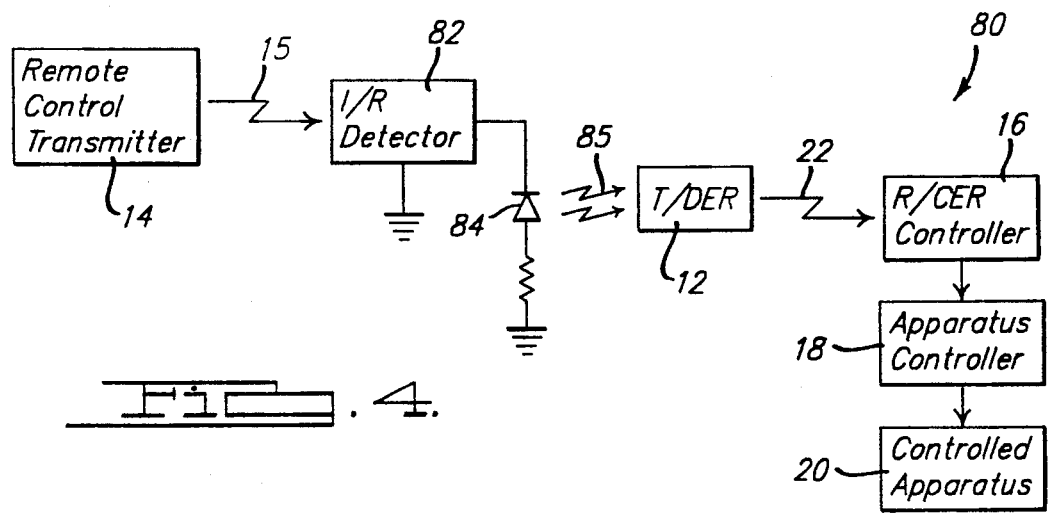
FIG. 4 is a remote control and signaling system made in accordance with the teachings of a second embodiment of the present invention.

Referring now to FIG. 4 there is shown a remote control and signaling system 80 made in accordance with the teachings of a second embodiment of this invention. As shown, system 80 is adapted to operate in combination with an existing remote control transmitter 14, receiver controller 18, and a controlled apparatus 20. Moreover, system 80 includes an infrared detector 82 which is adapted to be remotely positioned from transmitter 14 and from controller 18. Infrared detector 82 is further adapted to receive the infrared control signals 15 emanating from transmitter 14 and to operationally control infrared emitter 84, effective to regenerate or retransmit the received signals, to the previously described transducer 12.

As described earlier, upon receipt of this infrared signal 85, transducer 12 generates a relatively high frequency signal 22 to receiver 16, which is adapted to generate a second infrared signal to controller 18. This second infrared signal is then effective to cause controller 18 to generate a control signal to apparatus 20. In a preferred embodiment of this invention, infrared detector 82 comprises a Sharp Model IU60 infrared detector and emitter 84 comprises a Sharp Model GL528. It should be apparent to one of ordinary skill in the art, that the combination of infrared detector 82 and emitter 84 allow typical infrared control signals 15 to be regenerated in a manner which will obviate the need for transmitter 14 to be placed in a line of sight relationship with either receiver 16 or controller 18, thereby increasing the effective distance that transmitter 14 may be placed away from apparatus 20, while still achieving the desired operational control. Moreover, this arrangement obviates the need for attaching a separate control unit 12 to the transmitter 14. This could be highly desirable in situations involving many types of transmitters 14 since a single detector 82 obviates the need for multiple units 12 or the need to constantly transfer a single unit 12 among the many transmitters 14.

Referring now to FIG. 5, there is shown a transmitter mounting assembly 90, made in accordance with the teachings of a third embodiment of this invention. As shown, mounting assembly 90 includes a substantially "L" shaped base member 92 having a first planar and horizontally extending base member 94, movably coupled to a hollow vertical member 96, at one end 97. As shown, hollow member 96 is movable between a first flat non-active or storage position (shown in phantom in FIG. 5), in which member 96 is in substantially the same plane as member 94, and a second operative position, in which member 96 is substantially perpendicular to the plane defined by the top surface of member 94. The movable coupling of member 96 to member 94 may be achieved by known mechanisms.

As further shown, member 94 is adapted to movably mount a number of dissimilar remote control transmitters 98, 100, 102 by means of an adhesive strip 106 (such as Velcro). Moreover, hollow member 96 is adapted to contain transistors 108, 110, and 112, each of which is uniquely associated with one of the transmitters 98-102. Specifically, each transistor 108-112 has its base portion placed in optical communication with the unique infrared signal emanating from its associated transmitter 98-102. Moreover, and as shown best in FIG. 6, the emitter portion of each of these transistors 108-112 is coupled to the base of a fourth transistor 114, having its emitter grounded and its collector coupled to an infrared emitter, such as a Sharp Model GL528. As will be appreciated by one of ordinary skill in the art, this arrangement is effective to permit or cause infrared detector 116 to generate an infrared signal 118 upon receipt of an infrared signal by any of the transistors 108-112. Therefore, infrared signal 118 is generated each time an infrared signal has been generated by any one of the transmitters 98, 100, or 102. In the preferred arrangement of this third embodiment, this infrared signal 118 is optically coupled to transducer 12, which as previously explained is adapted to transmit a relatively high frequency signal 22 to a receiver 16. It should be appreciated by one of ordinary skill in the art, that assembly 90 allows for the relatively efficient placement of a number of dissimilar transmitters and allows for the relatively easy control of a multitude of apparatus 20, uniquely associated with the unique one of the transmitters 98, 100, or 102. Moreover, tags 120 may be removably placed upon member 94 to uniquely identify each of the transmitters 98, 100, 102 so as to obviate the need to "guess" which transmitter is needed to be activated. Moreover, the placement of these transmitters upon base 94 reduces the probability of lost or misplaced transmitters and improves the overall appearance of the surrounding area into which those transmitters are placed and used.

It is to be understood that the invention is not limited to the exact construction or method illustrated and described above, but that various changes and modifications may be made without departing from the spirit and scope of the invention, as defined in the following claims.

I claim:

1. A remote control mounting assembly for use in combination with a plurality of remote transmitters, each of said remote transmitters being adapted to transmit infrared signals to respective first and second receivers, said signals being effective to cause said first and second receivers to generate respective first and second control signals effective to control respective first and second apparatus, said remote control mounting assembly comprising:

an "L" shaped support member having a planar horizontally extending base adapted to removably support said plurality of remote controllers; a second hollow member movably coupled to one edge of said extending base, wherein said second hollow member is movable from a first position in which said second hollow member is co-planar with said support member to a second position in which said second hollow member is perpendicular with said support member; and a plurality of transistors contained within said second hollow member, each of said plurality of transistors having a base portion in optical communication with a unique one of said plurality of remote transmitters and an emitter portion coupled to a selectively activated light source, each of said plurality of transistors being adapted to receive an infrared signal from a unique one of said remote transmitters and, upon receipt of said infrared signal to activate said light source effective to cause one of said first and second receivers to generate one of said respective first and second control members.

* * * * *